United States Patent
Sakai et al.

(10) Patent No.: US 7,635,498 B2
(45) Date of Patent: Dec. 22, 2009

(54) FABRICATION METHOD FOR PERPENDICULAR MAGNETIC RECORDING MEDIA

(75) Inventors: Yasushi Sakai, Nagano (JP); Hiroyuki Uwazumi, Nagano (JP); Kazuo Enomoto, Nagano (JP); Sadayuki Watanabe, Nagano (JP)

(73) Assignee: Fuji Electric Device Technology, Co., Ltd., Tokyo (JP)

( * ) Notice: Subject to any disclaimer, the term of this patent is extended or adjusted under 35 U.S.C. 154(b) by 771 days.

(21) Appl. No.: 11/115,312

(22) Filed: Apr. 27, 2005

(65) Prior Publication Data

US 2005/0186358 A1 Aug. 25, 2005

Related U.S. Application Data

(62) Division of application No. 10/189,784, filed on Jul. 8, 2002, now Pat. No. 6,913,837.

(30) Foreign Application Priority Data

Jul. 6, 2001 (JP) .............................. 2001-206698

(51) Int. Cl.
- *B05D 5/12* (2006.01)
- *H01F 1/00* (2006.01)
- *G11B 5/81* (2006.01)
- *G11B 5/84* (2006.01)

(52) U.S. Cl. ................. 427/128; 427/131; 428/611; 428/694; 428/800; 428/846; 428/900; 204/192

(58) Field of Classification Search .................. 427/548, 427/128

See application file for complete search history.

(56) References Cited

U.S. PATENT DOCUMENTS

| 5,049,451 | A | | 9/1991 | Lai et al. |
| 5,498,457 | A | * | 3/1996 | Ishihara et al. ............ 428/835.8 |
| 5,668,685 | A | * | 9/1997 | Soeya et al. ............. 360/327.32 |
| 5,738,927 | A | * | 4/1998 | Nakamura et al. ........... 428/141 |
| 5,815,342 | A | * | 9/1998 | Akiyama et al. .......... 360/97.01 |
| 6,183,893 | B1 | * | 2/2001 | Futamoto et al. .......... 428/831.2 |
| 6,416,839 | B1 | * | 7/2002 | Xuan et al. .................. 428/826 |
| 6,447,936 | B1 | * | 9/2002 | Futamoto et al. ............ 428/827 |

(Continued)

FOREIGN PATENT DOCUMENTS

JP 62-046449 A 2/1987

(Continued)

OTHER PUBLICATIONS

T. Yogi, "Longitudinal Media for 1 Gb/in$^2$ Areal Density," IEEE Trans. Magn., vol. 26, p. 2271, 1990.*

*Primary Examiner*—Michael Kornakov
*Assistant Examiner*—Alexander Weddle

(57) ABSTRACT

A perpendicular magnetic recording medium and method thereof, includes a nonmagnetic substrate; a soft magnetic under layer; an intermediate layer; a bilayer magnetic recording layer; a protective layer; and a liquid lubricant layer. According to a following order, the soft magnetic under layer, the intermediate layer, the bilayer magnetic recording layer, the protective layer, and the liquid lubricant layer are sequentially stacked on the nonmagnetic substrate. The bilayer magnetic recording layer includes a first magnetic layer including a CoCr alloy crystalline film, and a second magnetic layer including a rare earth-transition metal alloy noncrystalline film.

19 Claims, 3 Drawing Sheets

U.S. PATENT DOCUMENTS

| | | | |
|---|---|---|---|
| 6,794,028 B2 * | 9/2004 | Uwazumi et al. | 428/829 |
| 2001/0026423 A1 * | 10/2001 | Arai et al. | 360/321 |
| 2002/0009619 A1 * | 1/2002 | Sakawaki et al. | 428/694 TS |
| 2002/0018917 A1 | 2/2002 | Sakai et al. | |
| 2002/0022153 A1 * | 2/2002 | Hosokawa | 428/694 ML |
| 2002/0058159 A1 | 5/2002 | Kubota et al. | |
| 2003/0064249 A1 | 4/2003 | Uwazumi et al. | |

FOREIGN PATENT DOCUMENTS

| | | | |
|---|---|---|---|
| JP | 62046449 A | * | 2/1987 |
| JP | 02-227814 A | | 9/1990 |
| JP | 02-287918 | | 11/1990 |
| JP | 2002-025031 A | | 1/2002 |

* cited by examiner

FABRICATION METHOD FOR PERPENDICULAR MAGNETIC RECORDING MEDIA

CROSS-REFERENCE TO RELATED APPLICATIONS

This application is a divisional of U.S. application Ser. No. 10/189,784, filed Jul. 8, 2002, now U.S. Pat. No. 6,913,837, which claims the benefit of Japanese Application No. 2001-206698, filed Jul. 6, 2001, in the Japanese Patent Office, the disclosures of which are incorporated herein by reference.

BACKGROUND OF THE INVENTION

1. Field of the Invention

The present invention relates to a perpendicular magnetic recording medium that may be installed in a variety of magnetic recording devices, and to a fabrication method thereof.

2. Description of the Related Art

As capacities of magnetic disk recording devices have become larger, a demand for high recording densities of magnetic recording media has increased. In conventional magnetic recording methods, longitudinal magnetic recording methods predominate, but, recently, perpendicular magnetic recording methods have been attracting attention as techniques for realizing a high recording density for the magnetic recording media.

A perpendicular magnetic recording medium has, as constituent elements, a magnetic recording layer of hard magnetic material, and an under layer formed from a soft magnetic material which, fulfills a role of concentrating a magnetic flux produced by a magnetic head employed to record on the magnetic recording layer. Currently, a CoCr alloy crystalline film is principally used as the soft magnetic material used for the magnetic recording layer of the perpendicular magnetic recording medium. Tests involving the refinement of CoCr crystal grains, a reduction in a particle size distribution, and intergranular interactive control, and the like, have been performed to achieve higher densities going forward.

On the other hand, a rare earth-transition metal alloy noncrystalline film, which is employed as a material for magneto-optical recording, has a large perpendicular magnetic anisotropy constant Ku, and exhibits highly superior thermal stability. Thus, this metal alloy noncrystalline film is extremely promising as a magnetic recording layer material for the perpendicular magnetic recording medium.

SUMMARY OF THE INVENTION

In a case of a CoCr alloy crystalline magnetic recording material presently used, a columnar structure is provided, which is constituted by growing crystal grains in a film thickness direction. The columnar structure represents a principal cause of medium-produced noise which is generated during a recording process. As subsequent recording is afforded a higher density, an effect exerted by grain boundaries on recording signals is becoming increasingly prevalent. In this regard, tests are also now being conducted which seek to reduce the effect of grain boundaries by refining a crystal grain size and other means. However, when the crystal grain size becomes too small, the thermal stability of the recorded signals deteriorates radically, and, depending on the case, a so-called thermal agitation problem is generated such that recorded signals are lost.

On the other hand, when a rare earth-transition metal alloy noncrystalline film is employed, no such grain boundaries are present due to a noncrystalline nature of the film, and the above problems are not produced. However, a phenomenon occurs where because no grain boundaries are present, no nucleus or such serving to stop written signals in locations thereof is present, and signals are sometimes shifted or lost. In particular, this phenomenon is easily generated during a high-frequency recording, thus, this film is hardly preferable as a material for the perpendicular magnetic recording medium that aims at a high recording density.

It is therefore an object of the present invention to provide a perpendicular magnetic recording medium, which exhibits favorable electromagnetic conversion characteristics even at a high recording density, and which has highly superior thermal stability and superior productivity, and to provide a fabrication method thereof. The problems mentioned hereinabove can be resolved by the perpendicular magnetic recording medium and fabrication method thereof according to the present invention illustrated herein below.

An exemplary embodiment of the present invention relates to a perpendicular magnetic recording medium formed by sequentially stacking, on a nonmagnetic substrate, at least a soft magnetic under layer, an intermediate layer, a bilayer magnetic recording layer, a protective layer, and a liquid lubricant layer, wherein the first layer of the bilayer magnetic recording layer is a magnetic layer including a CoCr alloy crystalline film, and the second layer thereof is a magnetic layer including a rare earth-transition metal alloy noncrystalline film. The CoCr alloy crystalline film has a film thickness of 10 nm to 30 nm, and the rare earth-transition metal alloy noncrystalline film has a film thickness of 2 nm to 15 nm, and in that, wherein when the film thickness of the CoCr alloy crystalline film is a, and the film thickness of the rare earth-transition metal alloy noncrystalline film is b, film thickness ratio a/b is equal to or more than 2.

Similarly, a further exemplary embodiment of the present invention provides a perpendicular magnetic recording medium formed by sequentially stacking, on a nonmagnetic substrate, at least an orientation control layer, a magnetic domain control layer, a soft magnetic under layer, an intermediate layer, a bilayer magnetic recording layer, a protective layer, and a liquid lubricant layer, wherein the first layer of the bilayer magnetic recording layer is a magnetic layer including a CoCr alloy crystalline film, and the second layer thereof is a magnetic layer including a rare earth-transition metal alloy noncrystalline film. The CoCr alloy crystalline film has a film thickness of 10 nm to 30 nm, and the rare earth-transition metal alloy noncrystalline film has a film thickness of 2 nm to 15 nm, and in that, when the film thickness of the CoCr alloy crystalline film is a, and the film thickness of the rare earth-transition metal alloy noncrystalline film is b, the film thickness ratio a/b is equal to or more than 2.

Furthermore, the rare earth-transition alloy noncrystalline material of the magnetic recording medium of the present invention includes 10 atom percent to 35 atom percent of at least one of Pr, Nd, Gd, Tb, Dy, and Ho, and a remainder including at least one of Ni, Fe, Co.

A further exemplary embodiment of the present invention relates to a fabrication method of the magnetic recording medium. Specifically, the fabrication method of the perpendicular magnetic recording medium is a fabrication method including depositing, on a nonmagnetic substrate, a soft magnetic under layer, an intermediate layer, a magnetic layer including a CoCr alloy crystalline film which is a first layer of a bilayer magnetic recording layer, a rare earth-transition metal alloy noncrystalline film which is a second layer of the bilayer magnetic recording layer, a protective layer, and a liquid lubricant layer, wherein the gas pressure employed during the depositing of the rare earth-transition metal alloy noncrystalline film of the bilayer magnetic recording layer is from 10 mTorr to 200 mTorr, and is preferably 20 mTorr to 100 mTorr.

Furthermore, according to a further exemplary embodiment, a perpendicular magnetic recording medium and a fabrication method thereof includes depositing, on a nonmagnetic substrate, an orientation control layer, a magnetic domain control layer, a soft magnetic under layer, an intermediate layer, a magnetic layer including a CoCr alloy crystalline film, which is a first layer of a bilayer magnetic recording layer, a rare earth-transition metal alloy noncrystalline film, which is a second layer of the bilayer magnetic recording layer, a protective layer, and a liquid lubricant layer, wherein the gas pressure employed during the depositing of the rare earth-transition metal alloy noncrystalline film of the bilayer magnetic recording layer is from 10 mTorr to 200 mTorr, and is preferably 20 mTorr to 100 mTorr.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

An exemplary embodiment of the present invention relates to a perpendicular magnetic recording medium. A description will be provided hereinbelow for exemplary embodiments of the magnetic recording medium of the present invention with reference to FIG. 1 and FIG. 2.

Figure 1:
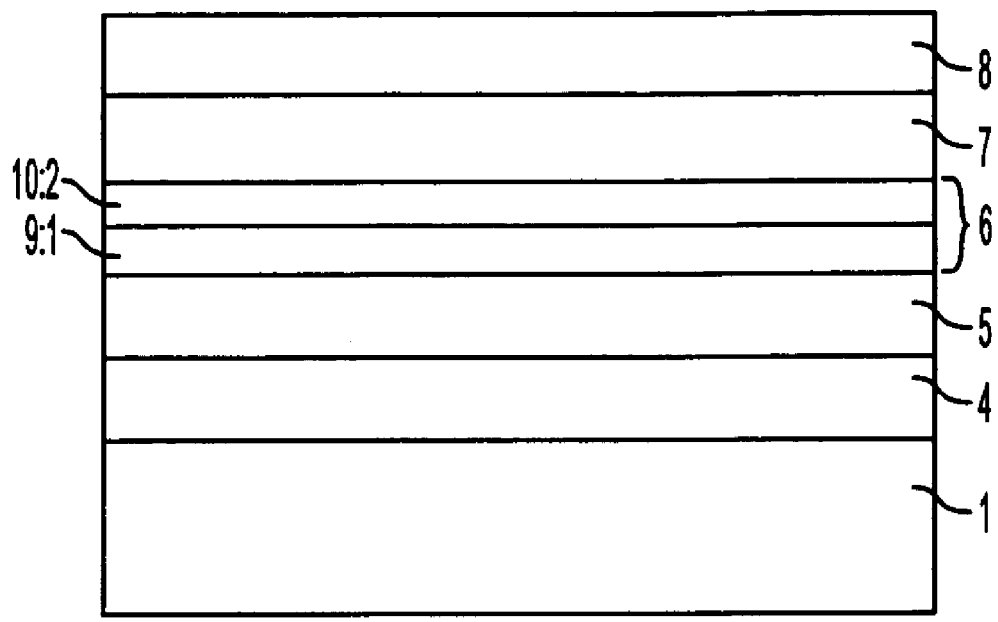
FIG. 1 is a cross-sectional schematic diagram showing a magnetic recording medium according to an Example 1, in accordance with an exemplary embodiment of the present invention.

FIG. 1 is a cross-sectional schematic diagram showing a perpendicular magnetic recording medium in accordance with an exemplary embodiment of the present invention. The perpendicular magnetic recording medium has a structure in which a soft magnetic under layer 4, an intermediate layer 5, a bilayer magnetic recording layer 6, and a protective layer 7 are deposited sequentially on a nonmagnetic substrate 1, and a liquid lubricant layer 8 is further deposited thereon.

In accordance with an exemplary embodiment of the present invention, an NiP-plated Al alloy, a chemical strengthened glass or a crystallized glass, for example, which are used for ordinary magnetic recording media, may be used for the nonmagnetic substrate 1. A noncrystalline Co alloy, an NiFe alloy, a Sendust (FeSiAl) alloy, or similar, can be used for the soft magnetic under layer 4. More particularly, favorable electromagnetic conversion characteristics can be obtained by using a noncrystalline Co alloy, for example CoNbZr, CoTaZr, or similar. A film thickness of the soft magnetic under layer 4 is modified to an optimum value depending on a structure and characteristics of a magnetic head used to record. In view of productivity, the soft magnetic under layer 4 may have a film thickness of 10 nm to 300 nm.

In accordance with an exemplary embodiment of the present invention, the intermediate layer 5 is used to magnetically isolate the soft magnetic under layer 4 and the bilayer magnetic recording layer 6, and to control the properties of a CoCr alloy crystalline film, which is a first layer 9 of the bilayer magnetic recording layer 6. As the material of the intermediate layer 5, a nonmagnetic element such as Ti, Ru, or a nonmagnetic alloy such as TiCr, CoCr, may be suitably employed. The intermediate layer 5 may have a film thickness of 5 to 30 nm.

In accordance with an exemplary embodiment of the present invention, the bilayer magnetic recording layer 6 is provided as a magnetic recording layer. This bilayer magnetic recording layer 6 has a bilayer structure including the first layer 9 and a second layer 10.

In accordance with an exemplary embodiment of the present invention, the first layer 9 is a magnetic layer of which a CoCr alloy crystalline material is a raw material, and the second layer 10 is a magnetic layer of which a rare earth-transition metal alloy noncrystalline material is the raw material. With the perpendicular magnetic recording medium of the present invention, examples of materials which can be employed as the CoCr alloy crystalline film are CoCr alloys such as CoCr, CoCrTa, CoCrPt, CoCrPtTa, and CoCrPtB. The above-mentioned CoCr alloy crystalline film of the first layer 9 has a film thickness of 10 nm to 30 nm because, with a film thickness of less than 10 nm, favorable magnetic characteristics are not obtained, and the SNR (ratio between the electromagnetic conversion characteristic signals and noise) drops; and, with a film thickness of more than 30 nm, the increased film thickness results in a drop in the SNR as a result of a noise increase.

The film of the second layer 10 having the rare earth-transition metal alloy noncrystalline material contains at least 10 atom percent and no more than 35 atom percent of at least one of Pr, Nd, Gd, Tb, Dy, and Ho. A remainder of this second layer 10 contains at least one transition metal including Ni, Fe, or Co. Tb alloys such as TbCo and TbFeCo are examples of materials, which can be employed in the second layer 10. The rare earth-transition metal alloy noncrystalline film may have a film thickness of 2 nm to 15 nm because, with a film thickness of less than 2 nm, the characteristics for the rare earth-transition metal noncrystalline film are not obtained; and, with a film thickness of more than 15 nm, the rare earth-transition metal noncrystalline film properties become too strong, and the SNR drops as a result of the production of fluctuations in the written signals.

In accordance with an exemplary embodiment of the present invention, in order to maintain the favorable properties of the bilayer magnetic recording layer 6, a condition exists where a ratio between the film thickness of the CoCr alloy crystalline film of the first layer 9 of the bilayer magnetic recording layer 6, and the film thickness of the rare earth-transition metal alloy noncrystalline film of the second layer 10 are constant.

The first and second layers are formed such that, when the film thickness of the CoCr alloy crystalline film is a, and the film thickness of the rare earth-transition metal alloy noncrystalline film is b, the film thickness ratio a/b is equal to or more than 2 because, when the film thickness ratio a/b is smaller than 2, the rare earth-transition metal alloy noncrystalline film properties are then strong and the SNR drops. The protective layer 7 can be deposited using a material employed conventionally. For example, the protective layer 7 can be formed from a material of which a main constituent is carbon. As for the conditions for the film thickness or similar of the protective layer 7, all conditions used for ordinary magnetic recording media can be employed.

A material employed conventionally can also be used for the liquid lubricant layer 8. For example, perfluoropolyethyl lubricants can be used. As for the conditions for the film thickness or similar of the liquid lubricant layer 8, all conditions used for ordinary magnetic recording media can be employed.

Figure 2:
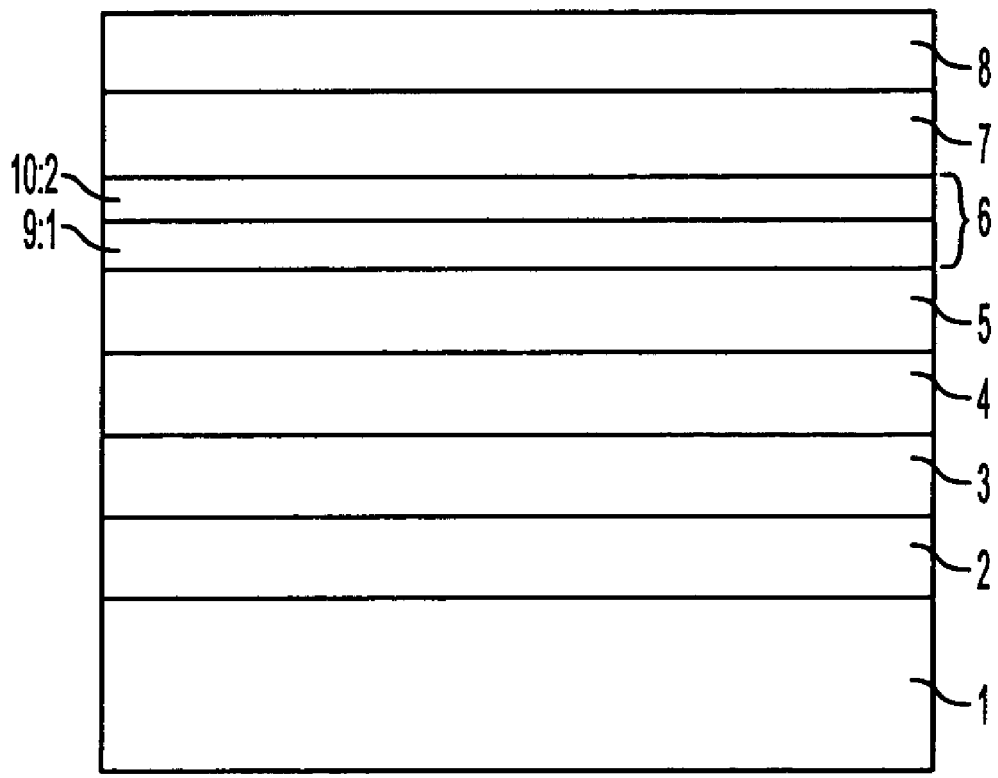
FIG. 2 is a cross-sectional schematic diagram showing the magnetic recording medium according to an Example 2, in accordance with an exemplary embodiment of the present invention.

FIG. 2 is a cross-sectional schematic diagram showing a constitution of the perpendicular magnetic recording medium according to an exemplary embodiment of the present invention. This magnetic recording medium has a structure in which an orientation control layer 2, a magnetic domain control layer 3, a soft magnetic under layer 4, an intermediate layer 5, a bilayer magnetic recording layer 6, and a protective layer 7 are deposited sequentially on a nonmagnetic substrate 1, and a liquid lubricant layer 8 is further deposited thereon.

The nonmagnetic substrate 11 may be made of a material like the nonmagnetic substrate 1 of the perpendicular storage medium described above.

For the magnetic domain control layer 3, an antiferromagnetic film, such as PtMn, IrMn or similar made from an alloy containing Mn, or a hard magnetic film of CoCrTa, CoCrPt, CoCrPtB or similar in which magnetization is oriented in a radial direction of the nonmagnetic substrate 1, can be employed. The magnetic domain control layer 3 may have a film thickness of 5 to 300 nm.

For the orientation control layer 2, in cases where an Mn alloy antiferromagnetic film is used for the magnetic domain control layer 3, a nonmagnetic pure metal, such as Cu, Ir, which has a face-centered cubic structure, or a nonmagnetic alloy or similar such as NiFeCr, may be used. In such a case, a primary coat of Ta, Zr, Nb, or similar, which has a film thickness of 3 nm to 30 nm, and preferably 5 to 10 nm, may be provided between the nonmagnetic substrate 1 and the orientation control layer 2, in order to control a fine structure of the orientation control layer 2. Further, in cases where a hard magnetic film is used as the magnetic domain control layer 3, a Cr alloy such as CrMo, CrW, or similar, can be used for the orientation control layer 2. In this case also, a primary coat governed by the condition of being like that described above, which serves to control the fine structure of the orientation control layer 2 may be provided between the nonmagnetic substrate 1 and the orientation control layer 2. The orientation control layer 12 may have a film thickness of 3 nm to 30 nm. The same materials as for the perpendicular storage medium described above can be employed for the soft magnetic under layer 4, the intermediate layer 5, the bilayer magnetic recording layer 6, the protective layer 7 and the liquid lubricant layer 8.

Next, a description will be provided for a fabrication method of the perpendicular magnetic recording medium of FIG. 1, according to an embodiment of the present invention. This perpendicular magnetic recording medium fabrication method includes depositing, on the nonmagnetic substrate 1, the soft magnetic under layer 4, the intermediate layer 5, a first layer 9 of the bilayer magnetic recording layer 6, the second layer 10 of the bilayer magnetic recording layer 6, the protective layer 7, and the liquid lubricant layer 8.

The soft magnetic under layer 4 is deposited on the nonmagnetic substrate 1. The NiP-plated Al alloy, the chemical strengthened glass or the crystallized glass, for example, which are used for ordinary magnetic recording media, can be used for the nonmagnetic substrate 1. To permit the stacking of layers on the nonmagnetic substrate 1, a surface of the nonmagnetic substrate 1 may be smooth and free of impurities.

Depositing the soft magnetic under layer 4 on the nonmagnetic substrate 1 is performed using a sputtering method or plating method. A noncrystalline Co alloy, an NiFe alloy, a Sendust (FeSiAl) alloy, or similar, can be used for the soft magnetic under layer 4. In particular, by using the noncrystalline Co alloy, for example, CoNbZr, CoTaZr, or similar, for example, it is possible to obtain favorable electromagnetic conversion characteristics. The film thickness of the soft magnetic under layer 4 is modified to an optimum value depending on the structure and characteristics of the magnetic head used for recording. However, in view of productivity, the soft magnetic under layer 4 may have a film thickness of 10 nm to 300 nm.

Next, the intermediate layer 5 is deposited. In this step, after heating the substrate surface temperature as far as 250° C., the intermediate layer 5 is similarly deposited using a sputtering method. The intermediate layer 5 is used to magnetically isolate the soft magnetic under layer 4 and the bilayer magnetic recording layer 6, and also to control properties of the CoCr alloy crystalline film, which is the first layer 9 of the bilayer magnetic recording layer 6. A nonmagnetic element such as Ti, Ru, or a nonmagnetic alloy such as TiCr, CoCr, may be suitably employed for the intermediate layer 5. The intermediate layer 5 may have a film thickness of 5 to 30 nm.

Next, the bilayer magnetic recording layer 6 is deposited. This bilayer magnetic recording layer 6 includes a first layer 9 and a second layer 10, these layers are deposited sequentially. First, the first layer 9 is formed by the sputtering method using a CoCr alloy crystalline material as the target. The material for this first layer is a CoCr alloy crystalline material making it possible to employ an alloy group such as CoCr, CoCrTa, CoCrPt, CoCrPtTa, CoCrPtB. The sputtering method of the present invention performs the method sputtering using a target by forming a crystalline film of a desired composition.

The film thickness of the first layer 9, when a CoCr alloy crystalline film is employed, may be 10 nm or more and no more than 30 nm because, with a film thickness of less than 10 nm, favorable magnetic characteristics are not obtained, and the SNR drops, and, with a film thickness of more than 30 nm, the increased film thickness results in a drop in the SNR on account of a noise increase. The sputtering conditions may be that, for example, Ar gas, which is generally used in sputtering, is employed, and that, by adjusting the flow amount of Ar gas or adjusting the degree of opening/closing of a valve provided at an interval from a vacuum pump, the gas pressure is on the order of 2 mTorr to 10 mTorr.

Subsequently, the second layer 10 of the bilayer magnetic recording layer 6 is deposited. The depositing of the second layer 10 is performed using a sputtering method employing, for example, an $RE_{(1-x)}$–$TM_x$ target (rare earth element (RE)= Ce, Pr, Nd, Pm, Sm, Eu, Gd, Tb, Dy, Ho, Er, Tm/transition metal (TM)=Co, Fe, Ni; x=0.5 to 0.95). As described in above, the rare earth-transition metal alloy noncrystalline film preferably contains at least 10 atom percent and no more than 35 atom percent of at least one of Pr, Nd, Gd, Tb, Dy, Ho, where a remainder of the film includes at least one or more transition metals including Ni, Fe, Co. Therefore, the conditions for the sputtering method are controlled so as to obtain such a composition. For example, an Ar gas, which is generally used in sputtering, may be employed as the gas employed during the depositing of the rare earth-transition metal alloy noncrystalline film, and that by adjusting the flow amount of Ar gas or adjusting a degree of opening/closing of a valve provided at an interval from a vacuum pump, the gas pressure is 10 mTorr to 200 mTorr, and preferably 20 mTorr to 100 mTorr. Such a range is adopted because, with a gas pressure of less than 10 mTorr, an exchange coupling in the film is extremely strong, and, in particular, signals in high frequency regions undergo a phase shift or annihilation, with the result that the SNR is of a small value on the order of 5 dB. Also, because, a high gas pressure of more than 200 mTorr, a film having a magnetization is in plane is produced, and associated characteristics are radically adversely affected.

The rare earth-transition metal alloy noncrystalline film may have a film thickness of 2 nm or more and no more than 15 nm because, with a film thickness of less than 2 nm, the properties for the rare earth-transition metal alloy noncrystalline film are not obtained. Further, with a film thickness of more than 15 nm, the rare earth-transition metal alloy noncrystalline film properties become too strong, and the SNR drops, as a result of the production of fluctuations in the written signals.

As described above, the bilayer magnetic recording layer 6 is deposited using two steps, namely a depositing step for the first layer 9 and a depositing step for the second layer 10. As described by the first invention, with the perpendicular magnetic recording medium of the present invention and fabrication method, thereof depositing conditions need to be set so as to fulfill the condition that the film thickness ratio between the first layer 9 and the second layer 10 should be in some range. In other words, the depositing conditions are set so that the first layer 9 and the second layer 10 are formed such that, when the film thickness of the CoCr alloy crystalline film constituting the first layer 9 is a, and the film thickness of the rare earth-transition metal alloy noncrystalline film constituting the second layer 10 is b, the film thickness ratio a/b is equal to or more than 2. The regulation of the film thickness has, as targets, regulation of the sputtering power and a depositing time interval, such that a film of a desired thickness may be formed. Control of the film thickness ratio in this manner is so that, in a case where the film thickness ratio a/b is smaller than 2, the rare earth-transition metal alloy noncrystalline film properties are then strong and the SNR drops.

The protective layer 7 is then deposited. Methods to deposit the protective layer 7 include sputtering methods, CVD methods, and cathodic arc carbon methods. Such methods can be used to deposit the protective layer 7 on the bilayer magnetic recording layer 6. The protective layer 7 can be deposited using a material which is employed conventionally. An employable material can be formed from a material of which the main constituent is carbon, for example. As for the conditions for the film thickness or similar of the protective layer 7, all conditions used for ordinary magnetic recording media can be employed.

When the above-described steps, in accordance with an embodiment of the present invention are performed using sputtering, all the gas pressures during the depositing other than the gas pressure employed during the depositing of the rare earth-transition metal alloy noncrystalline film may be adjusted to be from 2 mTorr to about 10 mTorr. The gas pressure adjustment method is like the gas pressure adjustment method during the depositing of the rare earth-transition metal alloy noncrystalline film. Conditions other than the gas pressure condition, such as temperature conditions, may be suitably selected to suit the conditions of the depositing for each layer.

In accordance with an exemplary embodiment of the present invention, the sputtering method may be employed to perform the above method because it is possible to perform using this method, serial reactions all together in a sputtering machine. However, the present invention is not limited to the fulfillment of all the conditions for the bilayer magnetic recording layer 6, it being possible to employ other conventional methods.

Next, the magnetic recording medium for which each of the layers is deposited is removed from the sputtering machine, and, finally, the liquid lubricant layer 8 is deposited. The liquid lubricant layer 8 can be deposited using a material employed conventionally. As an employable material, a perfluoropolyethyl lubricant can be used. The liquid lubricant layer 8 may be deposited on the magnetic recording medium obtained in the earlier method steps using a dip method, a spray method, a spin-coating method using a solution produced by dissolving the above liquid lubricant in a prescribed solvent. As for the conditions for the film thickness or similar of the liquid lubricant layer 8, all conditions used for ordinary magnetic recording media can be employed.

Next, a description is provided hereinbelow for a fabrication method of the perpendicular magnetic recording medium of FIG. 2 according to a further exemplary embodiment of the present invention. The fabrication method of the perpendicular magnetic recording medium is a method including depositing, on the nonmagnetic substrate 1, the orientation control layer 2, the magnetic domain control layer 3, the soft magnetic under layer 4, the intermediate layer 5, the first layer 9 of the bilayer magnetic recording layer 6, the second layer 10 of the bilayer magnetic recording layer 6, the protective layer 7, and the liquid lubricant layer 8.

The fabrication method of the perpendicular magnetic recording medium of FIG. 2, in accordance with this embodiment, is similar to the fabrication method of the perpendicular magnetic recording medium of FIG. 1 as described above, with the exception of the provision, on the nonmagnetic substrate, of the orientation control layer 2 and the magnetic domain control layer 3. Therefore, the fabrication of the orientation control layer 2 and the magnetic domain control layer 3 will be described hereinbelow, where the other steps are the same as in the fabrication method of the perpendicular magnetic recording medium as described above.

The depositing of the orientation control layer 2 can be performed by introducing the nonmagnetic substrate 1 to the sputtering machine and depositing the orientation control layer 2 using the sputtering method. As for the material of the orientation control layer 2, when an Mn alloy antiferromagnetic film is used for the magnetic domain control layer 3 to be deposited, a nonmagnetic pure metal having a face-centered cubic structure such as Cu, Ir, or a nonmagnetic alloy or similar such as NiFeCr, is desirably used. In such a case, a primary coat of Ta, Zr, Nb, or similar, may be provided between the nonmagnetic substrate and the orientation control layer 2, in order to control the fine structure of the orientation control layer 2. The primary coat may have a film thickness of 3 to 30 nm, and preferably 5 to 10 nm. The primary coat can be deposited using a conventional method such as the sputtering method. Further, in cases where a hard magnetic film is used as the magnetic domain control layer 3, a Cr alloy such as CrMo, CrW, or similar, can be used for the orientation control layer 2. In this case also, a primary coat governed by the condition of being like that described above which serves to control the fine structure of the orientation control layer 2, and may be provided between the nonmagnetic substrate 1 and the orientation control layer 2. The orientation control layer 2 may have a film thickness of 3 nm to 30 nm.

Next, the depositing the magnetic domain control layer 3 can be performed using the sputtering method. Sputtering conditions may include the example of heating the substrate surface temperature to 250° C. using a lamp heater or similar, and performing the depositing using a CoCrPt target.

As the material of the magnetic domain control layer 3, an antiferromagnetic film, such as PtMn, IrMn or similar composed from an alloy containing Mn, or a hard magnetic film of CoCrTa, CoCrPt, CoCrPtB or similar in which magnetization is oriented in a radial direction of the nonmagnetic substrate 1, can be employed. The magnetic domain control layer 3 may have a film thickness on the order of 5 to 300 nm.

Further, when a primary coat is provided between the orientation control layer and the nonmagnetic substrate, a material such as Ta, Zr, Nb, can be used for the primary coat to provide a film thickness of 3 to 30 nm, and preferably 5 to 10 nm. The materials for the soft magnetic under layer 4, the intermediate layer 5, the bilayer magnetic recording layer 6, the protective layer 7 and the liquid lubricant layer 8, and other materials, are the same as those described in the fabrication method for the magnetic recording medium as described above.

A further exemplary embodiment of the present invention relates to the perpendicular magnetic recording medium which is fabricated using the above fabrication method. Here, the perpendicular magnetic recording medium has a structure as described above.

EXAMPLES

Examples in accordance with exemplary embodiments of the present invention will be described herein below. The Examples below are merely examples to describe different embodiments of the present invention, and do not limit the present invention in any way.

Example 1

A chemically strengthened glass substrate having a smooth surface (an N-5 glass substrate manufactured by HOYA, for example) is used as the nonmagnetic substrate 1. After cleaning the substrate 1, same is introduced to the sputtering device, and a 200 nm CoZrNb noncrystalline soft magnetic under layer 4, and, after heating using the lamp heater such that a temperature of a surface of the substrate 1 reaches 250°C., a 15 nm TiCr intermediate layer 5, are sequentially deposited on the substrate. The bilayer magnetic recording layer 6 is formed by depositing] the first layer 9 of 20 nm using CoCrPt as the target, and the second layer 10 of 10 nm using an $RE_{(1-x)}-TM_x$ target (rare earth element (RE)=Ce, Pr, Nd, Pm, Sm, Eu, Gd, Tb, Dy, Ho, Er, Tm/transition metal (TM)=Co, Fe, Ni; x=0.5 to 0.95). After depositing a 5 nm protective layer 7 composed of carbon, the substrate 1 including the first layer 9 and the second layer 10 is removed from the sputtering machine.

Figure 4:
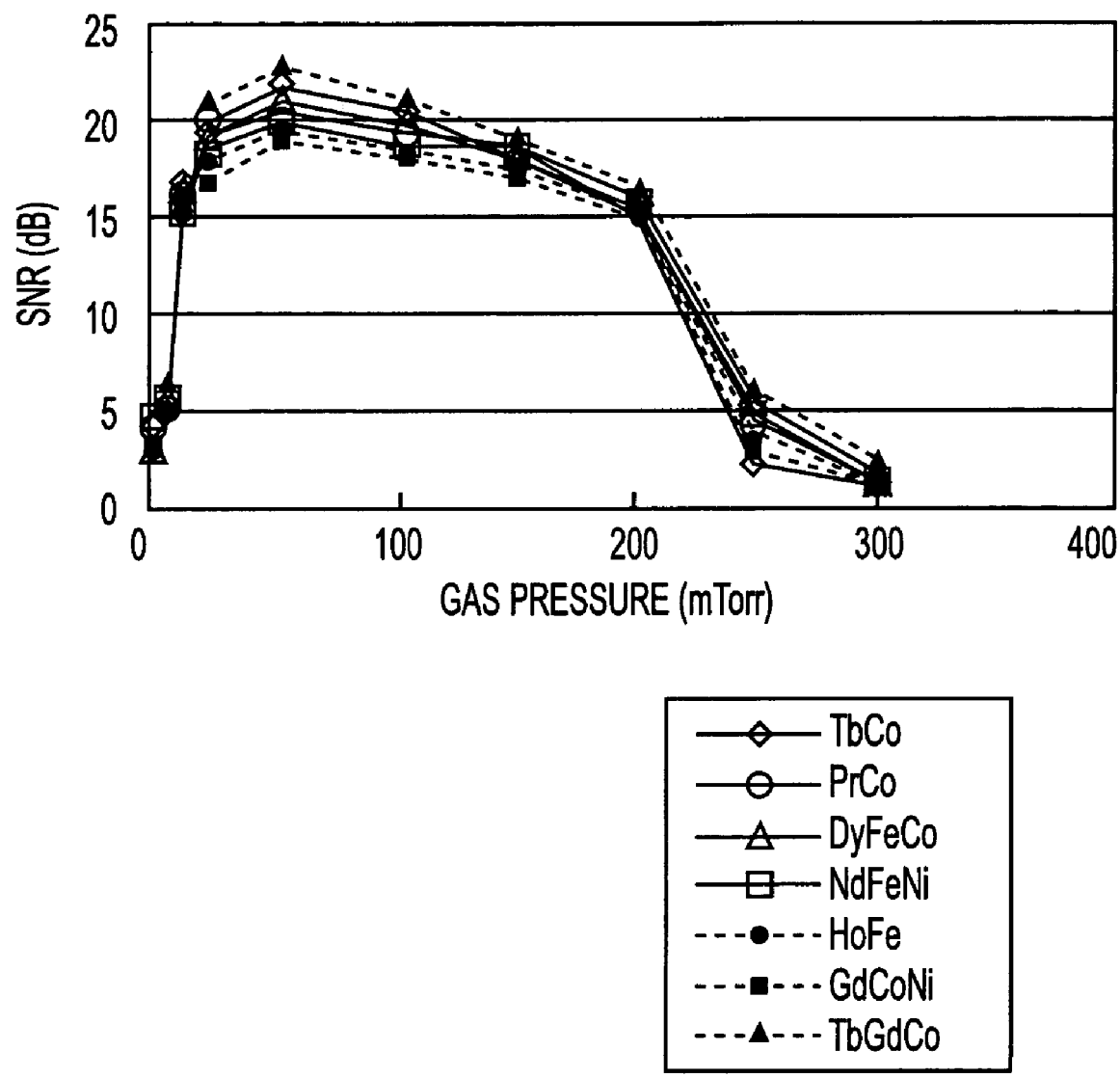
FIG. 4 is a graph illustrating the Examples 1 and 2 of the present invention showing SNR values when a gas pressure during a depositing of the rare earth-transition metal alloy noncrystalline film on a substrate is varied, in accordance with an exemplary embodiment.

The depositing, other than that of the rare earth-transition metal alloy constituting the second layer 10 of the bilayer magnetic recording layer 6, is entirely performed using a DC magnetron sputtering method with a gas pressure (Ar gas) of 5 mTorr. During the depositing of the second layer 10 of the bilayer magnetic recording layer 6, the gas pressure (Ar gas) within the sputtering machine is adjusted to a desired value (the gas pressure in FIG. 4 is 5 mTorr to 300 mTorr) by adjusting the overall flow amount of a depositing gas employed and the degree of opening of the valve provided between the sputtering machine and the vacuum pump. Thereafter, the liquid lubricant layer 8 of 2 nm composed of perfluoropolyethyl is deposited using the dip method, to produce the perpendicular magnetic recording medium.

Example 2

A chemically strengthened glass substrate having a smooth surface (an N-5 glass substrate manufactured by HOYA, for example) is used as the nonmagnetic substrate 1. After cleaning this substrate 1, same is introduced to the sputtering device. A 5 nm Ta primary coating, a 5 nm NiFeCr orientation control layer 2, a 10 nm IrMn magnetic domain control layer 3, a 200 nm CoZrNb noncrystalline soft magnetic under layer 4, and, after heating using the lamp heater such that the substrate surface temperature reaches 250° C., a 15 nm TiCr intermediate layer 5, are sequentially deposited on the substrate. The bilayer magnetic recording layer 6 is formed by depositing the first layer 9 of 20 nm using CoCrPt as the target, and a second layer 10 of 10 nm using an $RE_{(1-x)}-TM_x$ target (rare earth element (RE)=Ce, Pr, Nd, Pm, Sm, Eu, Gd, Tb, Dy, Ho, Er, Tm/transition metal (TM)=Co, Fe, Ni; x=0.5 to 0.95). After finally depositing a 5 nm protective layer 7 composed of carbon, the substrate 1 formed with layers is removed from the sputtering machine. The depositing, other than that of the rare earth-transition metal alloy constituting the second layer 10 of the bilayer magnetic recording layer 6, is entirely performed using a DC magnetron sputtering method under a gas pressure (Ar gas) of 5 mTorr. During the depositing of the second layer 10 of the bilayer magnetic recording layer 6, the gas pressure (Ar gas) within the sputtering machine is adjusted to a desired value (the gas pressure in FIG. 4 is 5 mTorr to 300 mTorr) by adjusting the overall flow amount of the depositing gas employed and the degree of opening of a valve provided between the sputtering machine and the vacuum pump. Thereafter, a liquid lubricant layer 8 of 2 nm including perfluoropolyethyl is deposited using a dip method, to thereby produce the perpendicular magnetic recording medium.

Comparative Example

A magnetic recording medium is fabricated using a procedure like that of Example 1 except that, in the fabrication method according to Example 1, following the depositing of the first layer 9 of the bilayer magnetic recording layer 6 using a CoCrPt target, the second layer 10 is not deposited.

<Evaluation>

In the above method, perpendicular magnetic recording media are fabricated after changing the target composition for the second layer 10 of the bilayer magnetic recording layer 6 as well as the gas pressure during the depositing. The magnetic characteristics of the perpendicular magnetic recording media thus fabricated, are calculated by measuring magnetization curves using a vibration-test-type magnetometer with respect to a sample fabricated without the depositing of the soft magnetic under layer 4, as in Example 1 above, and with respect to a sample fabricated without the depositing of the orientation control layer 3 and the soft magnetic under layer 4, as in Example 2 above. The electromagnetic conversion characteristics of the perpendicular recording media with all layers deposited in the methods illustrated in the above Examples are measured using a spin stand tester and a GMR head.

Because a disparity with regard to all the characteristics described hereinafter are not discerned in the perpendicular magnetic recording medium fabricated using the method of Example 1, and in the perpendicular magnetic recording medium fabricated using the method of Example 2, the results are taken to represent the characteristics of the perpendicular magnetic recording medium shown in Example 1. However, using the layer constitution shown in Example 2, it is possible to completely suppress spike noise of which a main cause is a magnetic domain formed by the soft magnetic under layer 4.

SNRs, at a recording density of 300 kFCl for the perpendicular magnetic recording media fabricated by modifying the film thickness and the film thickness ratio of the first layer 9 (CoCr alloy crystalline film) and the second layer 10 (rare earth-transition metal alloy crystalline film) of the bilayer magnetic recording layer 6, are shown in Tables 1 to 6. Tables 1 to 6 illustrate cases where the material of the second layer 10 (rare earth-transition metal alloy crytalline film) has been changed to TbCo, PrCo, NdFeNi, GdCoNi, DyFeCo, HoFe, respectively. Results of a determination of whether the material of the second layer 10 is good or not based on SNR=15 dB are combined and shown in the tables. According to the tables, when the thickness of the CoCr alloy crystalline film is a film thickness of less than 10 nm, the SNR falls because favorable magnetic characteristics cannot be obtained. Conversely, when the film thickness of the CoCr alloy crystalline film is a film thickness that is thicker than 30 nm, because the film thickness is then thicker, noise increases, and the SNR actually falls. Therefore, the film thickness of the CoCr alloy crystalline film is required to be 10 nm to 30 nm. With refard to the film thickness of the rare earth-transition metal alloy noncrystalline film, when this film thickness is thinner than 2 nm, the properties for the rare earth-transition metal alloy noncrystalline film are not obtained, and when the film thickness is thicker than 15 nm, the rare earth-transition metal alloy noncrystalline film properties become too strong, and the SNR drops as a result of a production of fluctuations in a written signal. Thus, when a favorable SNR is to be obtained at 15 dB or more, the film thickness is required to be from 2 nm to 15 nm.

Furthermore, with regard to the film thickness ratio a/b of both magnetic recording layers when the film thickness of the CoCr alloy crystalline film is a, and the film thickness of the rare earth-transition metal alloy noncrystalline film is b, when a/b is less than 2, the SNR drops. Thus, a/b is required to have a condition range of 2 or more. This condition range is common throughout the Tables 1 to 6. Further, the tables illustrated that the condition range can be applied also when different materials are used for the rare earth-transition metal alloy noncrystalline film.

TABLE 1

| CoCrPt film thickness a (nm) | TbCo film thickness b (nm) | a/b | SNR(@300kFCl) (dB) | Good? |
|---|---|---|---|---|
| 5 | 2 | 2.5 | 10.6 | No |
| 5 | 5 | 1 | 11.8 | No |
| 10 | 1 | 10 | 13.4 | No |
| 10 | 2 | 5 | 20.8 | Yes |
| 10 | 5 | 2 | 21.3 | Yes |
| 10 | 10 | 1 | 12.4 | No |
| 20 | 1 | 20 | 13.9 | No |
| 20 | 2 | 10 | 22.5 | Yes |
| 20 | 5 | 4 | 22.3 | Yes |
| 20 | 10 | 2 | 18.3 | Yes |
| 20 | 15 | 1.3 | 13.2 | No |
| 20 | 20 | 1 | 9.9 | No |
| 30 | 2 | 15 | 20.1 | Yes |
| 30 | 5 | 6 | 20.5 | Yes |
| 30 | 10 | 3 | 18.3 | Yes |
| 30 | 15 | 2 | 16.4 | Yes |
| 40 | 2 | 20 | 13.2 | No |
| 40 | 10 | 4 | 11.5 | No |
| 40 | 15 | 2 | 7.2 | No |

TABLE 2

| CoCrPt film thickness a (nm) | PrCo film thickness b (nm) | a/b | SNR(@300kFCl) (dB) | Good? |
|---|---|---|---|---|
| 5 | 2 | 2.5 | 11.6 | No |
| 10 | 5 | 2 | 22.1 | Yes |
| 10 | 10 | 1 | 12.7 | No |
| 20 | 2 | 10 | 22.0 | Yes |
| 20 | 5 | 4 | 21.8 | Yes |
| 20 | 15 | 1.3 | 12.9 | No |
| 30 | 1 | 30 | 12.8 | No |
| 30 | 5 | 6 | 19.9 | Yes |
| 40 | 10 | 4 | 12.3 | No |

TABLE 3

| CoCrPt film thickness a (nm) | NdFeNi film thickness b (nm) | a/b | SNR(@300kFCl) (dB) | Good? |
|---|---|---|---|---|
| 5 | 2 | 2.5 | 8.7 | No |
| 10 | 1 | 10 | 10.1 | No |
| 10 | 5 | 2 | 20.5 | Yes |
| 20 | 2 | 10 | 23.2 | Yes |
| 20 | 5 | 4 | 22.7 | Yes |
| 20 | 15 | 1.3 | 13.1 | No |
| 30 | 1 | 30 | 13.3 | No |
| 30 | 5 | 6 | 18.3 | Yes |
| 40 | 20 | 2 | 9.8 | No |

TABLE 4

| CoCrPt film thickness a (nm) | GdCoNi film thickness b (nm) | a/b | SNR(@300kFCl) (dB) | Good? |
|---|---|---|---|---|
| 5 | 5 | 1 | 7.9 | No |
| 10 | 1 | 10 | 13.7 | No |
| 10 | 2 | 5 | 18.7 | Yes |
| 20 | 2 | 10 | 22.4 | Yes |
| 20 | 5 | 4 | 23.1 | Yes |
| 20 | 10 | 2 | 19.3 | Yes |
| 30 | 2 | 15 | 20.1 | Yes |
| 30 | 20 | 1.5 | 13.3 | No |
| 40 | 10 | 4 | 13.2 | No |

TABLE 5

| CoCrPt film thickness a (nm) | DyFeCo film thickness b (nm) | a/b | SNR(@300kFCl) (dB) | Good? |
|---|---|---|---|---|
| 5 | 2 | 2.5 | 10.5 | No |
| 10 | 5 | 2 | 21.4 | Yes |
| 10 | 10 | 1 | 11.9 | No |
| 20 | 1 | 20 | 12.4 | No |
| 20 | 2 | 10 | 21.9 | Yes |
| 20 | 15 | 1.3 | 13.2 | No |
| 30 | 1 | 30 | 13.5 | No |
| 30 | 10 | 3 | 19.1 | Yes |
| 40 | 10 | 4 | 11.4 | No |

TABLE 6

| CoCrPt film thickness a (nm) | HoFe film thickness b (nm) | a/b | SNR(@300kFCl) (dB) | Good? |
|---|---|---|---|---|
| 5 | 1 | 5 | 8.5 | No |
| 10 | 1 | 10 | 11.6 | No |
| 10 | 2 | 5 | 18.7 | Yes |
| 20 | 2 | 10 | 22.3 | Yes |
| 20 | 5 | 4 | 23.4 | Yes |
| 20 | 10 | 2 | 20.8 | Yes |
| 30 | 1 | 30 | 13.4 | No |
| 30 | 10 | 3 | 19.9 | Yes |
| 40 | 20 | 2 | 9.3 | No |

The orientation of the magnetic anisotropy (perpendicular or in-plane) and values of the coercive force Hc of perpendicular orientation, when the transition metal of the rare earth-transition metal alloy noncrystalline film is Co and when the rare earth element material is varied, are shown in Table 7. In a group of materials examined, Pr, Nd, Gd, Tb, Dy, Ho exhibit perpendicular magnetic anisotropy, and a favorable Hc in a perpendicular direction is obtained, as required for the perpendicular magnetic recording medium,. Moreover, favorable characteristics for the perpendicular magnetic recording medium can also be obtained when two or more of these elements are combined.

TABLE 7

| Rare earth element | Magnetic Anisotropy | $HC_1$ (Oe) | Good? |
|---|---|---|---|
| Ce | in plane | — | No |
| Pr | perpendicular | 5890 | Yes |
| Nd | perpendicular | 4860 | Yes |
| Pm | in plane | — | No |
| Sm | in plane | — | No |
| Eu | in plane | — | No |
| Gd | perpendicular | 3580 | Yes |
| Tb | perpendicular | 8700 | Yes |
| Dy | perpendicular | 7930 | Yes |
| Ho | perpendicular | 4090 | Yes |
| Er | in plane | — | No |
| Tm | in plane | — | No |

Figure 3:
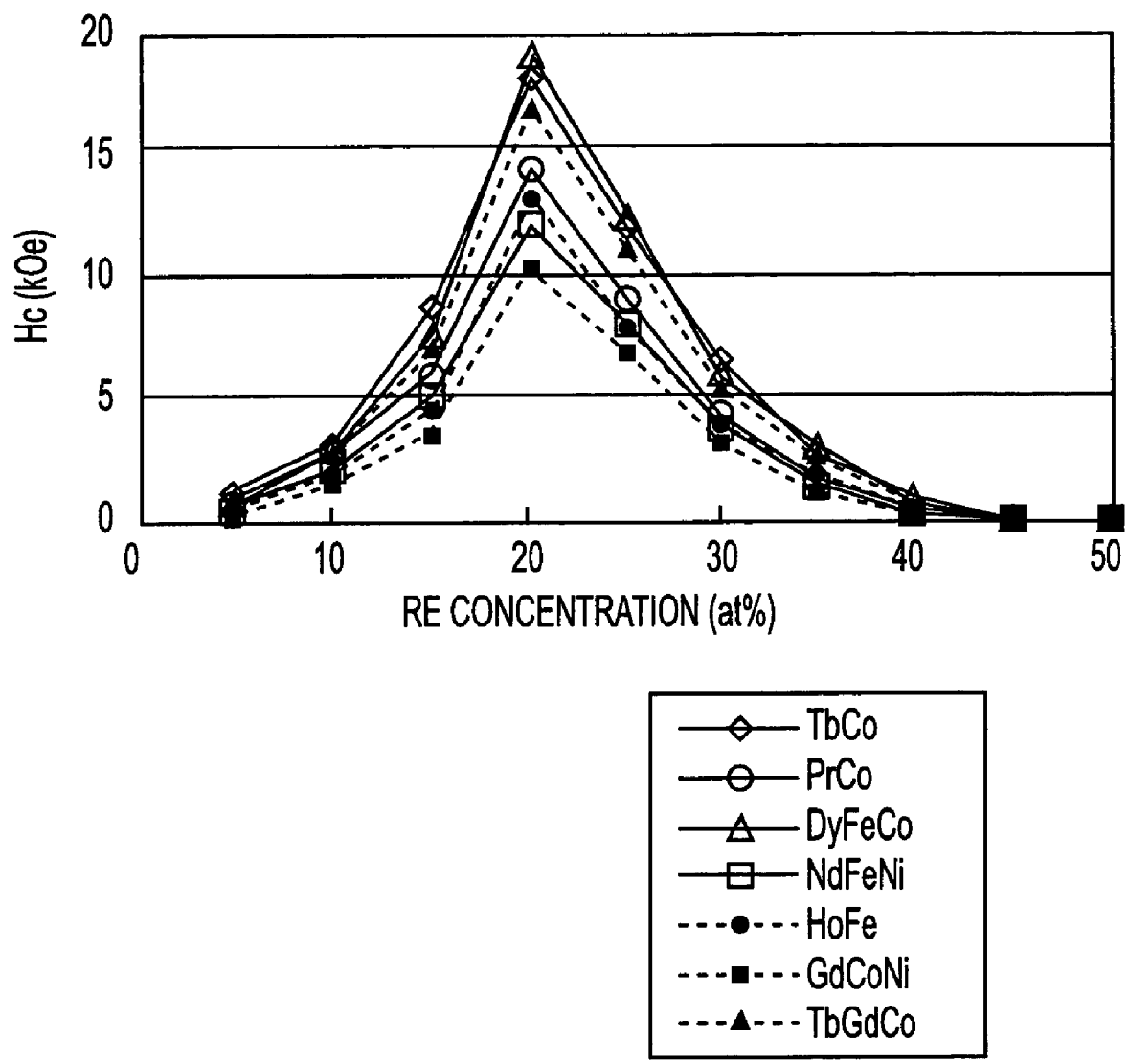
FIG. 3 is a graph illustrating the Examples 1 and 2 of the present invention showing values of a coercive force when a concentration of rare earth elements is varied, in accordance with an exemplary embodiment of the present invention.

Next, FIG. 3 shows a variation of Hc, when the rare earth-transition metal alloy noncrystalline film material is TbCo, PrCo, DyFeCo, NdFeNi, HoFe, GdCoNi, and/or TbGdCo, and the rare earth element (RE) concentration is varied FIG. 3. With a rare earth element concentration (RE) in the region of 10 atom percent to 35 atom percent in all the rare earth-transition metal alloy noncrystalline film materials subjected to testing, a coercive force of 1000 Oe or more is obtained which can be used for the perpendicular magnetic recording medium.

FIG. 4 is a graph showing SNR values at 300 kFCl, when the rare earth-transition metal alloy noncrystalline film material is TbCo, PrCo, DyFeCo, NdFeNi, HoFe, GdCoNi, and/or TbGdCo and when the gas pressure during the depositing of the rare earth-transition metal alloy noncrystalline film of the perpendicular magnetic recording medium fabricated in the Examples is varied.

In all the rare earth-transition metal alloy noncrystalline films subjected to testing, with a gas pressure of less than 10 mTorr, because the exchange coupling in the film is extremely strong, and, in particular, as a result of signals in high frequency regions undergoing a phase shift or annihilation, the SNR is a small value in the order of 5 dB. On the other hand, with a gas pressure of 10 mTorr or more, the coercive force squareness S* (an indicator which aims to evaluate an extent of inclination of the magnetization curves in the vicinity of the coercive force Hc, and which is such that, the larger the inclination of the magnetization curves), the smaller S* becomes. Generally, the larger an inclination of the magnetization curves, the smaller the medium noise becomes, and the SNR increase. Accordingly, the SNR increases abruptly, and a favorable characteristic on the order of 15 dB is exhibited. Further, in a range of from 20 mTorr to 100 mTorr, irrespective of which material is used, a characteristic of 15 dB or more is exhibited, and in particular for TbCo, PrCo, DyFeCo, and/or TbGdCo, a superior characteristic is exhibited, namely that the SNR is 20 dB or more. However, with a high gas pressure that is more than 200 mTorr, because the film having a magnetization that is in plane is produced, characteristics abruptly deteriorate.

Therefore, it is discovered that, as a result of performing the depositing with the gas pressure during the depositing at 10 mTorr or more and no more than 200 mTorr, favorable characteristics are exhibited even at a high recording density, and that a more preferable gas pressure is 20 mTorr to 100 mTorr.

Next, an investigation is conducted with regard to thermal stability using a magnetic recording medium fabricated using the method of Example 1, and using a magnetic recording medium fabricated using the method of the Comparative Example.

A measurement to investigate thermal stability is carried out using the procedure below. Using a spin stand tester, after performing writing once of signals by means of a GMR head, playback waveform reading is performed continuously. The proportion of the output drop 1000 seconds afterwards with respect to an output value immediately after writing is expressed as a percentage, this being an indicator to show thermal stability.

The results are shown in Table 8 below. The magnetic recording medium, of the Comparative Example, which has only the magnetic layer including CoCrPt and does not possess the magnetic layer having the raw material is a rare earth-transition metal alloy noncrystalline material, exhibited a large value of 3.2%/decade-sec. The magnetic recording medium of Example 1 is capable of quite a small value of 0.1%/decade-sec by virtue of the bilayer magnetic recording layer. Therefore, thermal stability is markedly improved by the layer constitution illustrated by the present invention.

TABLE 8

| Sample | thermal stability (%/decade-sec) |
|---|---|
| Comparative example (CoCrPt alone) | 3.2 |
| Example 1 (CoCrPt/TbCo) | 0.1 |

According to the present invention, as described hereinabove, the magnetic recording layers of the perpendicular magnetic recording medium is constituted by stacking two magnetic layers, of which the first layer is a magnetic layer made of the CoCr alloy crystalline film, and the second layer thereof is the rare earth-transition metal alloy noncrystalline film, the CoCr alloy crystalline film having a film thickness of 10 nm to 30 nm, and the rare earth-transition metal alloy noncrystalline film having a film thickness of 2 nm to 15 nm. When the film thickness of the CoCr alloy crystalline film is a, and the film thickness of the rare earth-transition metal alloy noncrystalline film is b, the film thickness ratio a/b is equal to or more than 2, and; as a result, a favorable SNR characteristic can be obtained even at a high recording density.

Furthermore, the rare earth-transition metal alloy noncrystalline material contains at least from 10 atom percent to 35 atom percent of at least one or more elements including Pr, Nd, Gd, Dy, and Ho, the remainder containing at least one or more transition metals including Ni, Fe, and Co, and the rare earth-transition metal alloy noncrystalline film is deposited under the condition that the gas pressure is 10 mTorr to 200 mTorr, and is preferably 20 mTorr to 100 mTorr. Consequently, in addition to being possible to obtain favorable characteristics for the perpendicular magnetic recording medium, because such a stacked medium can be produced simply by using already existing manufacturing machines, such medium is highly suited to mass production as a large capacity magnetic recording body.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fabrication method of a perpendicular magnetic recording medium, comprising:
    depositing a sequence of layers on a nonmagnetic substrate according to the following order: a soft magnetic under layer, an intermediate layer, a bilayer magnetic recording layer, a protective layer, and a liquid lubricant layer, wherein
        the bilayer magnetic recording layer comprises a first magnetic layer comprising a CoCr alloy crystalline film, and a second magnetic layer comprising a rare earth-transition metal alloy noncrystalline film, wherein the CoCr alloy crystalline film has a film thickness of 10 nm to 30 nm and the rare earth-transition metal alloy noncrystalline film has a film thickness of 2 nm to 15 nm, a thickness of the CoCr alloy crystalline film being at least twice a thickness of the rare earth-transition metal alloy noncrystalline film, and
        a gas pressure employed during the depositing of the rare earth-transition metal alloy noncrystalline film of the bilayer magnetic recording layer on the nonmagnetic substrate is 10 mTorr to 200 mTorr.

2. The fabrication method of the perpendicular magnetic recording medium according to claim 1, wherein the gas pressure employed during the depositing of said rare earth-transition metal alloy noncrystalline film is 20 mTorr to 100 mTorr.

3. A fabrication method of a perpendicular magnetic recording medium, comprising:
    depositing a sequence of layers on a nonmagnetic substrate according to the following order: an orientation control layer, a magnetic domain control layer, a soft magnetic under layer, an intermediate layer, a bilayer magnetic recording layer, a protective layer, and a liquid lubricant layer, wherein
        the bilayer magnetic recording layer comprises a first magnetic layer comprising a CoCr alloy crystalline film, and a second magnetic layer comprising a rare earth-transition metal alloy noncrystalline film, wherein the CoCr alloy crystalline film has a film thickness of 10 nm to 30 nm and the rare earth-transition metal alloy noncrystalline film has a film thickness of 2 nm to 15 nm, a thickness of the CoCr alloy crystalline film being at least twice a thickness of the rare earth-transition metal alloy noncrystalline film, and
        a gas pressure employed during the depositing of the rare earth-transition metal alloy noncrystalline film of the bilayer magnetic recording layer on the nonmagnetic substrate is 10 mTorr to 200 mTorr.

4. The fabrication method of the perpendicular magnetic recording medium according to claim 3, wherein the gas pressure employed during the depositing of said rare earth-transition metal alloy noncrystalline film is 20 mTorr to 100 mTorr.

5. The fabrication method of the perpendicular magnetic recording medium according to claim 1, wherein the soft magnetic under layer is formed on the nonmagnetic substrate using a sputtering method or plating method.

6. The fabrication method of the perpendicular magnetic recording medium according to claim 1, wherein the soft magnetic under layer is made of one of a Co alloy, a NiFe alloy or a FeSiAl alloy.

7. The fabrication method of the perpendicular magnetic recording medium according to claim 1, wherein the soft magnetic under layer is made of a noncrystaline Co alloy.

8. The fabrication method of the perpendicular magnetic recording medium according to claim 1, wherein the soft magnetic under layer has a thickness of 10 nm to 300 nm.

9. The fabrication method of the perpendicular magnetic recording medium according to claim 1, wherein the intermediate layer is deposited using a sputtering method after heating the substrate surface at 250° C.

10. The fabrication method of the perpendicular magnetic recording medium according to claim 1, wherein the intermediate layer is made of a nonmagnetic material including one of Ti, Ru, a TiCr alloy and a CoCr alloy.

11. The fabrication method of the perpendicular magnetic recording medium according to claim 1, wherein the intermediate layer has a thickness of 5 to 30 nm.

12. The fabrication method of the perpendicular magnetic recording medium according to claim 1, wherein the liquid lubricant layer is deposited using at least one of a dip method, a spray method, and a spin-coating method using a solution produced by dissolving the above liquid lubricant in a prescribed solvent.

13. The fabrication method of the perpendicular magnetic recording medium according to claim 3, wherein the orientation control layer comprises a nonmagnetic pure metal having a face-centered cubic structure, and the magnetic domain control layer comprises an Mn alloy antiferromagnetic film.

14. The fabrication method of the perpendicular magnetic recording medium according to claim 3, further comprising depositing a primary coat of one of Ta, Zr, and Nb, between the nonmagnetic substrate and the orientation control layer.

15. The fabrication method of the perpendicular magnetic recording medium according to claim 14, wherein the primary coat has a thickness of 3 to 30 nm.

16. The fabrication method of the perpendicular magnetic recording medium according to claim 14, wherein the primary coat has a thickness of 5 to 10 nm.

17. The fabrication method of the perpendicular magnetic recording medium according to claim 3, wherein the orientation control layer is made of a Cr alloy and the magnetic domain control layer is made of a hard magnetic film.

18. The fabrication method of the perpendicular magnetic recording medium according to claim 3, wherein the magnetic domain control layer has a thickness of 5 to 300 nm.

19. A fabrication method of a perpendicular magnetic recording medium, comprising:

depositing a sequence of layers on a nonmagnetic substrate according to the following order: a soft magnetic under layer, an intermediate layer, a bilayer magnetic recording layer, a protective layer, and a liquid lubricant layer, wherein the bilayer magnetic recording layer comprises a first magnetic layer comprising a CoCr alloy crystalline film, and a second magnetic layer comprising a rare earth-transition metal alloy noncrystalline film, wherein the CoCr alloy crystalline film has a film thickness of 10 nm to 30 nm and the rare earth-transition metal alloy noncrystalline film has a film thickness of 2 nm to 15 nm, and a gas pressure employed during the depositing of the rare earth-transition metal alloy noncrystalline film of the bilayer magnetic recording layer on the nonmagnetic substrate is maintained such as to limit SNR at a record density of 300 kFCl to less than 15 dB.

* * * * *